US 11,798,435 B2

(12) United States Patent
Poeppelmann (10) Patent No.: US 11,798,435 B2
(45) Date of Patent: Oct. 24, 2023

(54) EXECUTING A CRYPTOGRAPHIC OPERATION

(71) Applicant: Infineon Technologies AG, Neubiberg (DE)

(72) Inventor: Thomas Poeppelmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 912 days.

(21) Appl. No.: 16/568,758

(22) Filed: Sep. 12, 2019

(65) Prior Publication Data

US 2020/0082738 A1    Mar. 12, 2020

(30) Foreign Application Priority Data

Sep. 12, 2018   (DE) .......................... 102018122278.5

(51) Int. Cl.
*H04L 9/30*      (2006.01)
*G09C 1/00*      (2006.01)
*H04L 9/00*      (2022.01)

(52) U.S. Cl.
CPC .............. *G09C 1/00* (2013.01); *H04L 9/002* (2013.01); *H04L 9/3093* (2013.01)

(58) Field of Classification Search
CPC ......... G09C 1/00; H04L 9/002; H04L 9/3093; H04L 2209/127
See application file for complete search history.

(56) References Cited

U.S. PATENT DOCUMENTS

| 4,949,259 | A  | * | 8/1990 | Hunt | ................ | G10K 11/346 |
| | | | | | | 73/726 |
| 6,076,163 | A  | * | 6/2000 | Hoffstein | ........... | H04L 9/3271 |
| | | | | | | 713/168 |
| 7,363,336 | B1 |   | 4/2008 | Montgomery | | |
| 9,673,977 | B1 | * | 6/2017 | Kalach | ................. | H04L 9/0816 |
| 9,794,068 | B2 | * | 10/2017 | Yasuda | ................... | H04L 9/008 |
| 10,644,876 | B2 | * | 5/2020 | Williams | ............... | H04L 9/302 |
| 2011/0243320 | A1 | * | 10/2011 | Halevi | ................. | H04L 9/0861 |
| | | | | | | 380/30 |

(Continued)

FOREIGN PATENT DOCUMENTS

| AU | 2002353033 A1 | * | 6/2003 | ........... H04L 9/3093 |
| EP | 3622663 B1 | * | 11/2020 | ........... H04L 9/0819 |

OTHER PUBLICATIONS

Erdem Alkim, et al., "Algorithm Specifications and Supporting Documentation", Version 1.0, Nov. 30, 2017, pp. 1-44.

(Continued)

*Primary Examiner* — Lynn D Feild
*Assistant Examiner* — Abdullah Almamun
(74) *Attorney, Agent, or Firm* — COOPER LEGAL GROUP, LLC (57) ABSTRACT

A method for executing a cryptographic operation is provided comprising acts comprising: (i) sampling a first polynomial, wherein one or more (e.g., one, some and/or all) coefficients of the first polynomial are determined; (ii) sampling a second polynomial, wherein a selection of k coefficients of the second polynomial is determined; (iii) multiplying the first polynomial with the second polynomial to determine a result; and (iv) using the result of the multiplication in the cryptographic operation. A security device arranged to perform one, some and/or all of the acts is provided.

17 Claims, 4 Drawing Sheets

(56) References Cited

U.S. PATENT DOCUMENTS

| | | | |
|---|---|---|---|
| 2014/0177828 A1* | 6/2014 | Loftus | H04L 9/0852 380/44 |
| 2014/0237599 A1* | 8/2014 | Gertner | H04L 63/1425 726/24 |
| 2015/0067336 A1* | 3/2015 | Ding | H04L 9/3073 713/171 |
| 2016/0134653 A1* | 5/2016 | Vallone | H04L 41/046 726/25 |
| 2016/0182226 A1* | 6/2016 | Yasuda | H04L 9/3231 380/28 |
| 2017/0324554 A1 | 9/2017 | Tomlinson et al. | |
| 2018/0109376 A1 | 4/2018 | Gentry et al. | |
| 2018/0375639 A1* | 12/2018 | Lauter | H04L 9/008 |
| 2020/0153618 A1* | 5/2020 | Bhattacharya | H04L 9/0841 |

OTHER PUBLICATIONS

Erdem Alkim, et al., "Post-Quantum Key Exchange—A New Hope", Nov. 16, 2016, pp. 1-22.

Erdem Alkim, et al., "NewHope Without Reconciliation", Nov. 8, 2017, pp. 1-9.

* cited by examiner

EXECUTING A CRYPTOGRAPHIC OPERATION

RELATED APPLICATION

This application claims priority to German Patent Application No. 102018122278.5, filed on Sep. 12, 2018, entitled "Executing a cryptographic operation", which is incorporated herein.

SUMMARY

The present disclosure relates to an approach for efficiently conducing a cryptographic operation, for example to improve the robustness of such operations against side-channel attacks.

An objective is to improve existing solutions and/or provide an efficient solution to increase the robustness against side-channel attacks.

This is solved at least according to the features of the independent claims. Further embodiments result from the depending claims and the present disclosure.

The examples provided herein may be based on at least one of the following disclosed techniques. Combinations of the following features may be utilized to reach a desired result. The features of the method disclosed herein could be combined with any feature(s) of a device, apparatus and/or system, and/or vice versa.

An embodiment of the present disclosure relates to a method for executing a cryptographic operation, the method comprising sampling a first polynomial, wherein one or more (e.g., one, some and/or all) coefficients of the first polynomial are determined; sampling a second polynomial, wherein a selection of k coefficients of the second polynomial is determined; multiplying the first polynomial with the second polynomial to determine a result; and using the result of the multiplication in the cryptographic operation.

The polynomial may be any array, set of values or sequence (of values).

One or more of the disclosed techniques bear the advantage that a reduced amount of random numbers is required to conduct the cryptographic operation.

The k coefficients of the second polynomial are determined and/or the remaining coefficients of the second polynomial are 0.

Hence, the result of the multiplication is based on the first polynomial which has one, some and/or all coefficients of the first polynomial set and the second polynomial which has a portion of coefficients (e.g., only the portion of coefficients) of the second polynomial set. This allows the multiplication to be conducted in an efficient way.

The multiplication (e.g., a polynomial multiplication) may be performed in a ring $$R_q = \frac{Z_q[x]}{x^n + 1},$$

i.e. a polynomial multiplication is executed comprising a reduction modulo a polynomial $x^n+1$ and a reduction modulo an integer q.

As an alternative, the polynomial multiplication may be performed in a ring $$R_q = \frac{Z_q[x]}{x^n + 1}$$

and/or for any other ring.

For efficiency reasons, the polynomial multiplication can be performed using methods like schoolbook multiplication, Karatsuba multiplication and/or Number Theoretic Transform (NTT).

Alternatively and/or additionally, an algorithm for sparse polynomial multiplication may be used to exploit the property that k coefficients (e.g., only k coefficients) are set in the second polynomial and/or that k may be less than n (e.g., k may be small compared to n, such as less than a threshold proportion of n).

According to an embodiment, the cryptographic operation is an operation using a secret and/or an error, wherein the result of the multiplication is the secret and/or the error.

The cryptographic operation may be, e.g.: b=a·s+e, wherein b is the result of the operation, a is a uniform polynomial, s is the secret polynomial and e is the error polynomial.

According to an embodiment, the cryptographic operation may be used to generate a public key, generate a signature, generate a private key and/or encrypt data.

According to an embodiment, the one or more coefficients of the first polynomial are determined based on (and/or pursuant to) a first distribution and/or the k coefficients of the second polynomial are determined based on (and/or pursuant to) a second distribution.

The one or more coefficients of the first polynomial and/or the k coefficients of the second polynomial may follow the same distribution and/or may follow different distributions.

According to an embodiment, the one or more coefficients of the first polynomial and/or the k coefficients of the second polynomial are determined based on random numbers.

Random number in this regard may comprise one or more of true random numbers, pseudo-random numbers and/or deterministic numbers that follow a distribution.

According to an embodiment, the one or more coefficients of the first polynomial are determined such that a value 0 occurs with a probability amounting to $\zeta$, a value $-\lim1$ occurs with a probability amounting to $\alpha$ and/or a value $\lim1$ occurs with a probability amounting to $\beta$, wherein $\zeta+\alpha+\beta=1$.

For example, $\zeta=0.5$ and/or $\alpha=\beta=0.25$.

According to an embodiment, lim1 is a number between 1 and 16.

For example, lim1 may be +1 and/or −lim1 may be −1.

According to an embodiment, the k coefficients of the second polynomial are determined such that a value $-\lim2$ occurs with a probability of 0.5 and/or a value lim2 occurs with a probability of 0.5.

According to an embodiment, lim2 is a number between 1 and 5.

According to an embodiment, the method is used on a security device comprising an integrated circuit, a hardware security module, a trusted platform module, a crypto unit, a Field Programmable Gate Array (FPGA), a processing unit, a controller and/or a smartcard.

According to an embodiment, the cryptographic operation is a cryptographic Lattice operation.

According to an embodiment, sampling the first polynomial and/or sampling the second polynomial may comprise at least two acts of sampling and/or one act of selecting the first polynomial and/or the second polynomial from the at least two acts of sampling.

Alternatively and/or additionally, a security device is provided that is arranged to execute acts, the acts comprising: sampling a first polynomial, wherein one or more (e.g., one, some and/or all) coefficients of the first polynomial are determined; sampling a second polynomial, wherein a selection of k coefficients of the second polynomial is determined; multiplying the first polynomial with the second polynomial to determine a result; and using the result of the multiplication in a cryptographic operation.

According to an embodiment, the security device is one of the following and/or comprises at least one of the following: an integrated circuit, a hardware security module, a trusted platform module, a crypto unit, a FPGA, a processing unit, a controller and/or a smartcard.

Alternatively and/or additionally, a computer program product is provided, which is directly loadable into a memory of a digital processing device, comprising software code portions for performing one, some and/or all acts of the method as described herein.

In addition, a security device is provided, comprising: means for sampling a first polynomial, wherein one or more (e.g., one, some and/or all) coefficients of the first polynomial are determined; means for sampling a second polynomial, wherein a selection of k coefficients of the second polynomial is determined; means for multiplying the first polynomial with the second polynomial to determine a result; and/or means for using the result of the multiplication in a cryptographic operation.

BRIEF DESCRIPTION OF THE DRAWINGS

Embodiments are shown and illustrated with reference to the drawings. The drawings serve to illustrate the basic principle, so that aspects necessary for understanding the basic principle are illustrated. The drawings are not to scale. In the drawings the same reference characters denote like features.

DETAILED DESCRIPTION

Various internet and industry standards use asymmetric cryptography based on Rivest-Shamir-Adleman (RSA) and/or elliptic curve cryptography (ECC) to protect data communication between smart cards, smart phones, computers, servers and/or industrial control systems. As an example, with the RSA algorithm a public-key encryption (PKE) scheme can be realized that allows sending an encrypted email (e.g., with Pretty Good Privacy (PGP), Gnu Privacy Guard (GPG) and/or Secure/Multipurpose Internet Mail Extensions (S/MIME)) to a recipient without the need to first exchange a symmetric key via a secure channel. Instead, the public key of the recipient is sufficient to achieve confidentiality.

Other applications of asymmetric cryptography are digital signatures, also based on RSA and/or ECC. They can be used to sign and verify data, the public key is used to check the validity of a signature.

Together, PKE and digital signatures are both crucial in the Transport Layer Security (TLS) protocol which is the backbone of secured communication in the Internet and used by browsers, smart phones and IoT (Internet of Things) devices. TLS establishes a secured channel between two devices where communication is encrypted, checked for manipulation, and where the identity of the participants is verified using a digital certificate provided through a public-key infrastructure (PKI). When connecting to a website, e.g., of a bank, using https instead of http, the browser uses TLS. Commonly, a green lock and further information may be displayed to show that the communication is running with the banks website and that attacks by a so-called man-in-the-middle are prevented. Without such PKI-based identity check in combination with strong data encryption it would be possible for attackers to manipulate the communication and to impersonate the accessed website.

However, RSA and ECC-based public keys might be subject to a successful attack.

A quantum computer can be described as a computer that makes direct use of quantum-mechanical phenomena to accelerate processing. Crucial concepts to build a quantum computer are so-called quantum-bits or qubits that store a state in a quantum register. Such quantum computers may be used to successfully break cryptographic concepts that were considered sufficiently safe before such processing power was available.

Hence, there is a general motivation to move away from classical asymmetric cryptosystems (RSA/ECC) to schemes which cannot be successfully attacked by quantum computers. As a consequence, new solutions for signature schemes, key exchange, and public-key encryption are required that are not based on the same foundations as RSA and ECC (i.e., the discrete logarithm problem or factoring). This need for new technical solutions has already been acknowledged by standardization bodies like NIST (National Institute of Standards and Technology) investigating alternative cryptosystems.

A cryptosystem may be a cryptographic public key encryption, key exchange and/or signature scheme, and/or an advanced scheme like homomorphic encryption and/or attributed based encryption. In public-key encryption, a non-secret public key is used to encrypt data that can be decrypted (e.g., can only be decrypted) with the associated secret key. In signature schemes a secret key is used to sign a message and it can be verified with the associated public key that the signer was in possession of the secret key and thus authorized to produce the signature. Key exchange and/or key establishment is an interactive protocol where two parties establish a secret key that is unknown to a passive and/or sometimes active adversary or eavesdropper. Alternatively and/or additionally, different options can be used combining public key encryption, key exchange and/or signature schemes into protocols like, e.g., TLS.

One class of schemes that is supposed to resist attacks by quantum computers are lattice-based cryptosystems. Lattice-based cryptosystems might become the successor of RSA and ECC and/or may operate on large matrices (standard lattices) and/or on polynomial rings (ideal lattices). For lattice-based cryptography, reference is made to https://en.wikipedia.org/wiki/Lattice-based_cryptography, which is incorporated by reference.

A lattice is a structure that is created by integer linear combinations of basis vectors. Thus a lattice can be described as a regular structure in an n dimensional space. Alternatively and/or additionally, a lattice can be perceived as an arrangement of points in a Euclidean space with a regular structure. Given n linearly independent vectors $b_1, \ldots, b_n \in \mathbb{R}^m$, a lattice $\mathcal{L}$ generated by them is defined as $$\mathcal{L}(b_1, \ldots, b_n) = \{\Sigma x_i b_i | x_i \in \mathbb{Z}\},$$

wherein $b_1, \ldots, b_n$ is a basis of the lattice and an element from $\mathbb{R}^m$ is a vector with m entries from $\mathbb{R}$.

In the lattice $\mathcal{L}$ (i.e. an n-dimensional space) certain fundamental problems, like finding a short basis and/or a short vector are conjectured to be computationally hard or at least complex enough to use them for cryptography. The hardness of breaking a lattice-based cryptosystem can be reduced and/or related to the hardness of solving such a fundamental problem. Lattice-based cryptography or a lattice-based cryptosystem is thus a cryptographic system whose security is based on the hardness or related to the hardness of certain mathematically hard problems in lattices.

Lattices may be used to construct cryptosystems. Lattice-based cryptography is also associated with the user-friendly learning with errors (LWE) problem and the ring-LWE (RLWE) problem. In this context a "problem" refers to a mathematical problem (e.g., finding something) that is conjectured to be hard to solve (i.e., no polynomial time algorithm is available) but that also allows the construction of a cryptographic scheme (e.g., like factoring problem for RSA or discrete logarithm for ECC).

In general, to solve an LWE problem, one has to recover a secret vector s in $\mathbb{Z}_q^n$ when given a set of approximate random linear equations on the secret vector s. Hence, the set of linear equations is distorted by a certain amount of randomness, which makes it hard for known algorithms to solve this set of equations.

The LWE and RLWE problems thus allow constructing schemes where the actual lattice structure is not really visible to the designer of a scheme. However, when trying to solve the LWE or RLWE problems, lattice algorithms are used as the problem to find the secret vector and/or polynomial s. This is also described as solving of a "lattice-problem". The RLWE problem works over polynomial rings and supports a security reduction to hard problems on ideal lattices while LWE enables reductions to random lattices. As a consequence, ideal lattices carry more structure as not all lattices are ideal lattices but also allow the design of schemes that utilize more practical public-key, ciphertext, and signature lengths.

Prominent examples of lattice-based cryptography are the so-called NTRU and NTRU-sign schemes as well as the so-called Goldreich-Goldwasser-Halevi (GGH) scheme, (see, e.g., https://en.wikipedia.org/wiki/GGH_encryption_scheme). For most schemes the conversion from public key encryption to key exchange is trivial. Additionally, for PKE various security levels like semantic security with respect to adaptive chosen plaintext (CPA) or semantic security with respect to adaptive chosen ciphertext attacks (CCA) can be achieved using standard conversions.

This has exemplarily been shown for the NewHope scheme that can also be instantiated as a CPA-secure or CCA-secure PKE, such as described in E. Alkim, R. Avanzi, J. Bos, L. Ducas, A. de la Piedra, T. Pöppelmann, P Schwabe, D. Stebila, NewHope—Submission to the NIST post-quantum project, in: https://csrc.nist.gov/Projects/Post-Quantum-Cryptography/Round-1-Submissions, which is incorporated by reference. The NewHope-Simple and other schemes are a straightforward adaptation of a scheme called LPR10, such as described in E. Alkim, L. Ducas, T. Pöppelmann, P Schwabe, NewHope without reconciliation in: IACR Cryptology ePrint Archive 2016: 1157 (2016), which is incorporated by reference. Examples of lattice-based signature schemes include Dilithium, BLISS, GLP12, and qTESLA (see, e.g., https://csrc.nist.gov/Projects/Post-Quantum-Cryptography/Round-1-Submissions, which is incorporated by reference).

Technical Challenges Concerning Lattice-Based Cryptography

When realizing lattice-based cryptography and lattice-based cryptosystems on a computer, a microcontroller and/or an integrated circuit, multiple technical challenges arise, for example:

Achieve improved performance by performing acts of a cryptosystem using specifically optimized sequence of operations and/or by using one, some and/or all features of the available target hardware (special registers or instructions).

Realization of the acts using a minimum amount of volatile or non-volatile memory.

Efficient and comprehensive protection against implementation attacks are required when cryptosystems are executed on a secure chip-card controller and/or in any adverse environment (e.g., on a Hardware Security Module (HSM)). Possible attacks are side-channel attacks where an attacker tries to obtain secret information by observing a physical behavior of a device, like power consumption, electric emanation and/or temperature. Alternatively and/or additionally, fault-attacks are possible where an attacker tries introducing disturbances (e.g., with a laser) in the execution flow or data to obtain secret information or to influence the behavior of a device.

Notation and Abbreviations

The following notations, abbreviations and references are used:

q is an integer, k is an integer, n is an integer, mod q is the modulo operation modulo q defined over the integers where the result is in the range [0,q−1], $\mathbb{Z}$ are the integers (number written without a fractional component); for a definition of "number", reference is made to https://en.wikipedia.org/wiki/Number; for a definition of "fractional component", reference is made to https://en.wikipedia.org/wiki/Fraction_(mathematics), $\mathbb{R}$ are the real numbers (such number may have a fractional component), $\mathbb{Z}_q$ is the ring of integers modulo q which is the quotient ring $\mathbb{Z}/q\mathbb{Z}$ of equivalence classes of integers modulo q X is an indeterminate, f is a polynomial of maximum degree of integer n, $R = \mathbb{Z}[X]/(f)$ is a ring of integer polynomials modulo f; elements $v \in \mathbb{Z}[X]/(f)$ can be represented by integer polynomials of a degree less than the integer n or alternatively as a vector of coefficients $V \in \mathbb{Z}^n$, $R_q = \mathbb{Z}_q[X]/(f)$ is a ring of integer polynomials modulo both the polynomial f and the integer q; the elements $v \in \mathbb{Z}_q[X]/(f)$ can be represented by integer polynomials of degree less than n with coefficients reduced modulo q or alternatively as a coefficient vector $v \in \mathbb{Z}_q^n$, $v \in R_q$ is a polynomial (written in bold) that is an element in $R_q$, v[i] is a coefficient of a vector or polynomial $v \in R_q$ at a position i, $\vartheta$ error distribution, $\leftarrow^{\$}$ $\leftarrow^{\$}$ random sampling from a set or distribution, $D_{Z,\sigma}$ discrete Gaussian distribution over the integers with standard deviation $\sigma$, $\psi_k$ binomial distribution with integer parameter k, U( ) uniform distribution, $1001_b$ a number in binary notation, such that $1001_b = 9$, $U(R_{q,k})$ uniformly random sampling of a polynomial in $R_q$ where one or more (e.g., one, some and/or all) coefficients are uniformly random in [−k, k], FFT Fast Fourier Transform, NTT Number Theoretic Transform, DPA Differential Power Analysis, SPA Simple Power Analysis, ALU Arithmetic Logic Unit.

The quotient ring is a construction in abstract algebra; for details, reference is made to, e.g., https://en.wikipedia.org/wiki/Quotient_ring.

Ideal Lattices and Polynomial Arithmetic

Currently, there exists at least two types of lattice-based cryptography, i.e. ideal lattice-based cryptograph and standard lattice-based cryptography. A middle ground is a so-called modular lattice-based cryptography that mixes concepts from ideal and standard lattices. Reference is made to E. Alkim, R. Avanzi, J. Bos, L. Ducas, A. de la Piedra, T. Pöppelmann, P Schwabe, D. Stebila, NewHope—Submission to the NIST post-quantum project, in: https://csrc.nist-.gov/Projects/Post-Quantum-Cryptography/Round-1-Submissions, which is incorporated by reference.

The basic operations in ideal lattice-based cryptography are polynomial multiplications, additions and/or subtractions in the quotient ring $$R_q = Z_q[x]/(f),$$

where the modulus q is an integer and the dimension (e.g., number of coefficients) is an integer n. A polynomial $a \in R_q$ can be represented as an array of values and a single value a[i] at an integer position i can be accessed. One, some and/or all computations in lattice-based cryptosystems schemes may be performed on arrays of values modulo q.

For the quotient ring, operations like addition and multiplication can be defined. An addition $c = a + b$ for a, b, $c \in R_q$ may be defined as $$c = \sum_{i=0}^{n-1}(a[i] + b[i] \bmod q) \cdot X^i$$

where i is an integer, q is an integer, a[i] is the i-th coefficient of a, b[i] is the i-th coefficient of b and X is the indeterminate. A subtraction $c = a - b$ works in the same manner with "+" being replaced by "−".

The product $c = a \cdot b$ of polynomials a, b, $c \in R_q$ can also be computed. It is defined as a normal polynomial multiplication (sometimes also called "schoolbook" multiplication) followed by a reduction modulo the polynomial f and a reduction modulo the integer q, i.e.

$$c = \left(\sum_{i=0}^{n-1}\sum_{j=0}^{n-1} a[i] + b[j] \, x^{i+j} \bmod q\right) \bmod f.$$

The formula for polynomial multiplication can be simplified by considering the special rule that $x^n \equiv -1$ when $f = x^n + 1$ but similar polynomials may be used accordingly:

$$c = \sum_{i=0}^{n-1}\sum_{j=0}^{n-1} (-1)^{\lfloor \frac{i+j}{n} \rfloor} a[i] b[j] \, x^{i+j \bmod n} \bmod q$$

where i and j are integers, q is an integer, a[i] is the i-th coefficient of a, b[j] is the j-th coefficient of b and x is the indeterminate.

Sparse Multiplication

Some efficiency for polynomial arithmetic can be gained with algorithms that exploit specific properties of polynomials. As an example, a polynomial $s \in R_q$ may have (e.g., may only have) few coefficients (e.g., less than a threshold number of coefficients) that are non-zero, it may also only consist of coefficients that are one and/or minus one (e.g., −1), and/or it may in general have coefficients that are small (e.g., less than a threshold value). Alternatively and/or additionally, it may exhibit a combination of such properties.

The Number Theoretic Transform (NTT)

An implementation following this formula would require $n^2$ modular multiplications and would thus be rather expensive.

Another approach for fast polynomial multiplication is the number theoretic transform (NTT). The NTT is basically a fast Fourier transformation (FFT) defined over a finite field or ring. Thus one, some and/or all complex roots of unity of the FFT are exchanged for integer roots of unity and computations are carried out in the ring of integers modulo an integer q. A polynomial multiplication for a, b, $c \in R_q$ using NTT can be computed as $$c = a \cdot b = NTT^{-1}(NTT(a) \circ NTT(b))$$

where "$\circ$" denotes a coefficient-wise multiplication, $\hat{a} = NTT(a)$ is the transformation of the polynomial a, $\hat{b} = NTT(b)$ is the transformation of the polynomial b, and $NTT^{-1}( )$ is the inverse transformation. The coefficient-wise multiplication $\hat{c} = \hat{a} \circ \hat{b}$ for, $\hat{a}, \hat{b}, \hat{c} \in Z_q[x]$ can be defined as $$\hat{c} = \sum_{i=0}^{n-1} (\hat{a}[i] \cdot \hat{b}[i] \bmod q) \cdot X^i.$$

The advantage of the NTT is that a polynomial multiplication operation may require (e.g., only requires) roughly $n \log_2 n$ modular multiplications when an efficient algorithm is used and that a reduction modulo $$f = x^n + 1$$

(the so-called circular convolution property) or a reduction modulo $$f = x^n - 1$$

can be integrated into the NTT algorithm. Thus an n-point NTT is sufficient to work with n-coefficient polynomials.

To formally introduce the NTT, the choice of parameters may be restricted; also, the following may be set such that the NTT exists:

$$f = x^n + 1$$

and $$q \equiv 1 \bmod 2n.$$

Further, a polynomial may be defined as follows $$g = \sum_{i=0}^{n-1} g[i]X^i \in R_q$$

such that $$NTT(g) = \hat{g} = \sum_{i=0}^{n-1} \hat{g}[i]X^i$$

with $$\hat{g}[i] = \sum_{j=0}^{n-1} \gamma^j g[i]\omega^{ij} \bmod q,$$

Where integer ω is an 2n-th primitive root of unity and integer γ=√ω mod q. So γ is a square root of ω modulo q.

The inverse transformation works similar. For a polynomial $\hat{g} \in R_q$ it can be defined as:

$$NTT^{-1}(\hat{g}) = g = \sum_{i=0}^{n-1} g[i]X^i$$

with $$g[i] = \left(n^{-1}\gamma^{-1}\sum_{j=0}^{n-1} \hat{g}_j\omega^{-ij}\right) \bmod q.$$

A straightforward computation of the NTT with the previously given definition has quadratic complexity and is not more efficient than the schoolbook approach. Thus, to realize fast polynomial multiplication using the convolution theorem, a fast algorithm to compute the NTT is required. This can be achieved via an implementation of the NTT with O(n log n) operations in $Z_q$, e.g., by the Cooley-Tukey radix-2 decimation-in-time (DIT) algorithm (see, e.g., https://en.wikipedia.org/wiki/Cooley%E2%80%93Tukey_FFT_algorithm) and/or by a decimation-in-frequency (DIF) algorithm. The DIT NTT algorithm recursively splits the computation into a sub-problem on the even inputs and a sub-problem on the odd inputs of the NTT.

Computation of a Polynomial Inverse

The computation of the Polynomial Inverse may be required in signatures and can be used for implementation of security measures.

Some of the cryptographic algorithms require the computation of the inverse of a polynomial $a^{-1}$ for $a \in R_q$ such that $a \cdot a^{-1} = 1$.

Fermat's little theorem is an approach for computing the multiplicative inverse of integers in $Z_q$ but it can also be applied to $R_q$. The polynomial multiplicative inverse $a^{-1}$ can be computed as $a^{-1}=a^{q-2}$. This process can be sped up using the NTT and/or methods for exponentiation like (right-to-left or left-to-right) square-and-multiply and/or an addition chain.

When a is transformed into the NTT domain, a multiplication is just a coefficient-wise multiplication.

As an example, $a^3$ can be computed based on a'=NTT(a) as follows:

$$a^3 = NTT^{-1}(a' \circ a' \circ a'),$$

which may be faster than computing $a^3 = a*a*a$ using algorithms like schoolbook and/or Karatsuba multiplication.

With an addition chain the number of coefficient-wise multiplications can be further reduced depending on the share of q.

Randomness and Random Sampling $a \leftarrow^\$ S$ indicates an action of selecting the variable a independently and uniformly at random from some set S and/or a specific distribution S.

It is noted that "random" and/or "uniform" in this regard (e.g., selecting randomly or any random value) may be a true random, a pseudo-random or a deterministic approach to obtain a value. Hence, the property of such "randomness" and/or any random effect according to the proposal provided herewith may be that an attacker is unaware of the value and that values are different for at least a portion of operations. The randomness may add a certain level of entropy between values that are "randomly" determined, e.g., generated and/or selected.

For a finite set S, a uniform distribution on the set S may be referred to as U(S). The notation $a \leftarrow^\$ (R_{q,k})$ may indicate a uniformly random sampling of $a \in R_q$ where one or more (e.g., one, some and/or all) coefficients of a are [−k, k].

For a probability distribution χ on R it is assumed that an efficient sampling is feasible and the notation $a \leftarrow^\$ \chi$ is used to denote the random sampling of $a \in R$ from the probability distribution χ.

The sampling of secret noise and/or error vectors is a basic task in lattice-based public-key encryption (PKE), key exchange and/or signature schemes. An attribute of such noise and/or error vectors is that they may be small (i.e., with coefficients that are close to zero and/or that are less than a threshold value).

A discrete Gaussian distribution $D_{Z,\sigma}$ with mean 0 and standard deviation σ>0 over the integers associates a probability $$\rho_\sigma(x)/\rho_\sigma(Z) \text{ to } x \in Z \text{ for } \rho_\sigma(x) = \exp\left(\frac{-x^2}{2\sigma^2}\right) \text{ and}$$

$$\rho_\sigma(Z) = 1 + \sum_{i=1}^{\infty} \rho_\sigma(i).$$

Thus $a \leftarrow^\$ D_{Z,\sigma}$ denotes a process of randomly sampling a value $d \in Z$ according to the discrete Gaussian distribution $D_{Z,\sigma}$ and $a \leftarrow^\$ D_{Z,\sigma}^n$ indicates a process of randomly sampling of a polynomial $a \in R_q$ of dimension n where coefficients are independent and distributed according to the discrete Gaussian distribution $D_{Z,\sigma}$.

A sampler that produces values according to a discrete Gaussian distribution can be realized using the cumulative distribution function (CDF) and/or a cumulative distribution table (CDT) and/or with (e.g., high-precision) computations.

As Gaussian sampling is costly, execution of a cryptographic scheme may require 510 to 4096 samples from the noise and/or error distribution for each cryptographic operation.

Mathematical Problems on Lattices

The security of lattice-based cryptosystems may be based on and/or can be related to certain problems. Such specific problems are:

the Learning with errors (LWE) problems;

the Ring Learning with errors (RLWE) problem;

the short integer solution (SIS) problem;

the Ring short integer solution (RSIS) problem; and/or the NTRU problem.

For RLWE the following applies in the ring $R_q=Z_q[X]/(X^n+1)$ for n being an integer power of 2 and q being an integer:

The secret vector $s \in R_q$ is based on a distribution $\vartheta_i$, the error vector e is based on a distribution $\vartheta_2$, wherein the distribution $\vartheta_1$ may be the same as the distribution $\vartheta_2$.

The vector $a \in R_q$ with uniform coefficients in $Z_q$ is based on a uniform distribution (hence, it is also denoted as "uniform vector").

An attacker wants to extract the secret vector s when given the uniform vector a as well as the result b=a·s+e.

This is difficult if the secret vector s and/or the error vector e follow a predefined distribution design, hence, if the vectors s and/or e will be created in an efficient way. Alternatively and/or additionally, the generation of these vectors s and/or e may be hardened against physical attacks on a chipcard.

A chipcard (or smartcard) may be any physical device arranged to conduct a cryptographic function. The chipcard may therefore comprise one or more semiconductor circuits.

It is an option that the secret vector s is fixed, generating uniform vectors a and generating error vectors e according to the distribution design. Still, the attacker has difficulties to derive the fixed secret vector s from multiple samples of vectors a and b. The RLWE problem translates the LWE problem into the ring setting. The hardness of RLWE is based on the worst-case hardness of short-vector problems on ideal lattices, which are a subclass of standard lattices. The RLWE problem also has a decision problem (decide if a sample a, b is from the RLWE distribution or uniform) that is equivalent to the search version.

Hence, if the attacker is able to determine that the sample b is uniform or generated according to the RLWE distribution, the security of the system may be compromised.

It is possible to sample the secret $s \in R_q$ from the uniform distribution $U(R_q)$. However, beneficially, the sampling may be based on the distribution $\vartheta$.

Exemplary Embodiments

Operations in standard lattice-based cryptography comprise matrix-matrix multiplications, matrix-vector multiplications and/or vector additions and/or subtractions where coefficients are values in the ring of integers modulo q.

One or more of the embodiments described herein provide for using polynomial arithmetic to realize a more efficient sampler supplying the distribution $\vartheta$ to be utilized in lattice-based cryptosystems.

One or more of the embodiments described herein provide for generating n samples from the distribution $\vartheta$ by sampling two polynomials and/or performing a polynomial multiplication.

One polynomial $w_1 \in R_q$ is sampled such that one or more (e.g., one, some and/or all) coefficients are independent and 0 with a probability amounting to 0.5, −1 with a probability amounting to 0.25 and 1 with a probability amounting to probability 0.25.

Another polynomial $w_2$ is sampled in a way that integer k coefficients at random positions are set where the respective coefficients are 1 with a probability amounting to 0.5 and −1 with a probability amounting to 0.5.

A polynomial multiplication is performed in the ring $R_q=Z_q[x]/(x^n+1)$. This means that a standard polynomial multiplication is executed that is followed by a reduction modulo a polynomial $x^n+1$ and a reduction modulo an integer q.

Thus $w_3=w_1 \cdot w_2$ for $w_1, w_2, w_3 \in R_q$ is obtained, wherein $w_3$ could be the secret vector s and/or the error vector e.

Due to the nature of polynomial multiplication, each coefficient of $w_3$ is the sum of k coefficients of $w_1$ that were selected by the k positions in $w_2$ that were set. This way a full polynomial with coefficients following the distribution $\vartheta$ (close or exactly) is obtained with a reduced amount of random numbers (e.g., a significantly reduced amount of random numbers).

For efficiency reasons, the polynomial multiplication can be performed efficiently using methods like schoolbook multiplication, Karatsuba multiplication and/or NTT as $$w_3=w_1 \cdot w_2=NTT^{-1}(NTT(w_1) \circ NTT(w_2)).$$

Alternatively and/or additionally, an algorithm for sparse polynomial multiplication may be used to exploit the property that $w_2$ has only k positions set and that k may be less than n (e.g., k may be small compared to n, such as less than a threshold proportion of n).

One or more of the disclosed embodiments described herein can be used in combination with other techniques, e.g., Frodo, Kyber or NewHope such as Protocol 3 described in E. Alkim, L. Ducas, T. Pöppelmann, P Schwabe, Post-quantum key exchange–a new hope, in: IACR Cryptology ePrint Archive 2015: 1092 (2015), which is incorporated by reference. This may apply where samples from the distribution $\psi_k$ are accessed.

The notation $w_3 \leftarrow^\$ ConvSample(k)$ indicates that a sampler uses the approach described herein and outputs a polynomial $w_3 \in R_q$. The polynomial $w_3$ has n coefficients distributed according to the binomial distribution D.

Alternatively and/or additionally, one or more of the disclosed embodiments may use different distributions and parameters for $w_1$ and $w_2$. The polynomial $w_3=w_1 \cdot w_2$ may follow a binomial distribution and/or any other type of distribution.

For example, the polynomial $w_1$ can be sampled in a way that one or more (e.g., one, some and/or all) coefficients are independent and 0 with a probability amounting to $\zeta$, −1 with a probability amounting to $\alpha$ and 1 with a probability amounting to $\beta$, wherein $\zeta+\alpha+\beta=1$.

Additionally, certain positions of $w_1$ or $w_2$ can be set with values greater than 1 (e.g., one or more coefficients (e.g., less than a threshold number of coefficients) can be set to −2,2 or −3,3).

It is an option to achieve some protection against observatory attacks (e.g., side channel attacks): A uniformly random polynomial $r \leftarrow^\$ U(R_q)$ may be sampled where each coefficient is uniformly random between 0 and q−1. The polynomials $w_1$ and $w_2$ may be sampled as described above.

To randomize the computation the random polynomial r may be added to the polynomial $w_1$ such that $$w_1' = w_1 + r.$$

The computations $$w_3' = w_1' \cdot w_2$$

and $$w_3'' = r \cdot w_2$$

are performed for $w_3', w_1', w_2, w_3'', r \in R_q$.

It then holds that $$w_3 = w_3' - w_3'' = (w_1+r)w_2 - r \cdot w_2 = w_1 w_2 + r w_2 - r w_2 = w_1 w_2.$$

However, as the two polynomials $w_3'$, $w_3''$ carry a secret value it may be useful to continue processing on two shares so that further computations are also protected.

Figure 4:
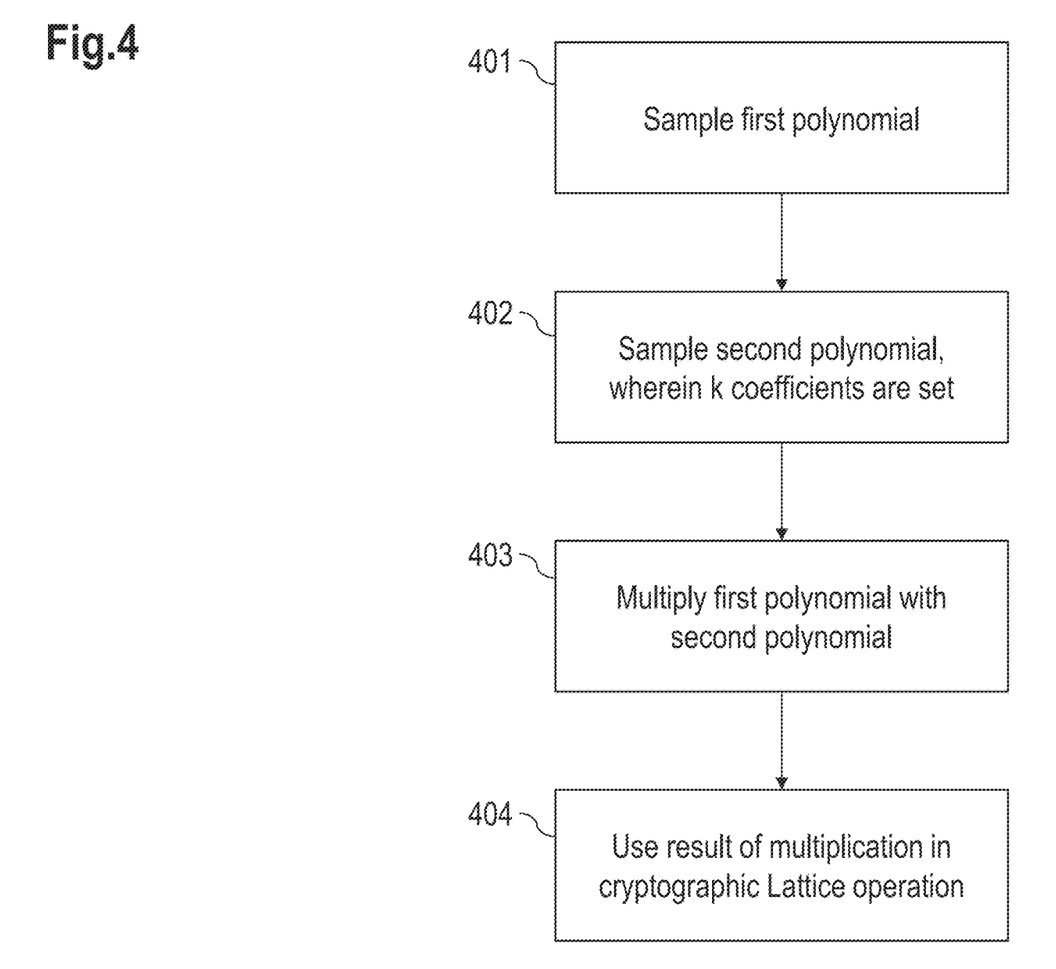
FIG. 4 shows an exemplary diagram that visualizes acts to be conducted to efficiently execute a cryptographic Lattice operation.

FIG. 4 shows an exemplary diagram that visualizes acts to be conducted to efficiently execute a cryptographic Lattice operation. At act 401, a first polynomial is sampled, wherein one or more (e.g., one, some and/or all) coefficients of the first polynomial are determined based on a first distribution. At act 402, a second polynomial is sampled, wherein a selection of k coefficients of the second polynomial is determined based on a second distribution, which may be the same as or different from the first distribution. The remaining coefficients of the second polynomial are 0 and/or set to 0. At act 403, the first polynomial is multiplied with the second polynomial to determine a result. At act 404, the result of the multiplication is used in the cryptographic Lattice operation.

Exemplary Implementation

Hereinafter, an exemplary code segment using the freely available SAGE software system shows an exemplary implementation. It may be appreciated that other software (e.g., software different than the freely available SAGE software system) may be used for implementing one or more of the embodiments presented herein, including acts associated with the following exemplary code segment:

```
n = 1024
q = 7681
k = 16
R.<x> = PolynomialRing(ZZ)
Rq.<x> = PolynomialRing(GF(q))
f = x^n + 1
def set_positions(k, val = 1):
    # set_positions allows to set k positions with value k#
    # Initialize with zero#
    pos = n*[0]
    cnt = k
    while cnt > 0:
        # Select a position
        z = randint(0,n-1)
        # Check that position is not yet occupied
        if pos[z] == 0:
            cnt = cnt -1
            # Sample a 1 or -1
            if randint(0,1) == 0:
                pos[z] = val
            else:
                pos[z] = -val
    return pos
def centred_list(c):
    # Convert polynomial to list and center the coefficients
    c = list(c)
    for i in range(len(c)):
        c[i] = int(c[i])
        if c[i] > int(q/2.0):
            c[i] = c[i] - q
    return c
def ConvSample(k):
    # Initialize a with 0 or {0,-1}
    a = R([((((-1)**randint(0,1)))*randint(0,1)) for _ in range(n)])
    #print "a", a
    # Initialize b with k set positions
    b = R(set_positions(k))
    #print "b", b
    # Perform the polynomial multiplication
    c = (a*b) % f
    #print "c", c
    # Convert to list and center
    return centred_list(c)
c =[ ]
for i in range(10):
    c.extend(ConvSample(k))
#print first 100 values
print "Sampled values:"
print c[0:100]
```

The sampled values based on this code segment are as follows:
[1, 3, 2,−1, 1, 4, 2, 2, 4, 2, 1, 2,−6, 2, 6,−4,−3, 1,−1,−2, 7, 3, 3,−2, 0,−3,−4, 0, 1,−2,−4, 2,−3, 1,−3,−3, 6,−1,−2, 2, 0,−1, 0, 7, 1, 4, 2,−2, 1,−1,−1,−1, 3, 2, 4, 2, 1, 0,−1,−4,−2,−1,−1, 0, 1, 1,−2,−1,−6, 0, 2,−5,−3,−2,−5, 1, 1, 1,−2, 3,−4,−3, 3, 1, 2,−1, 0,−5, 4, 4,−1,−1,−1, 0, 3, 0,−1, 3, 1, 1]

The following added code segment
print "Standard deviation:",
RR(real(sage.stats.basic_stats.std(c)))
print "Expected standard deviation", sqrt(k/2.0)
a,b,_=pylab.hist(c,normed=True,bins=np.arange(−10, 12))) Leads to the following output:
Standard deviation: 2.83235152907955
Expected standard deviation 2.82842712474619
[(−10, 0.00048847205939820239), (−9, 0.00097694411879640478), (−8, 0.0020515826494724504), (−7, 0.0062524423602969914), (−6, 0.01397030089878859), (−5,0.034193044157874171), (−4, 0.052950371238765143), (−3, 0.079425556858147714), (−2, 0.11205549042594763), (−1, 0.13130128956623682), (0, 0.13481828839390386), (1, 0.1319851504493943), (2, 0.11088315748339195), (3, 0.08098866744822196), (4, 0.05490425947635795), (5, 0.027842907385697536), (6, 0.016021883548261038), (7, 0.005568581477139508), (8, 0.0027354435326299334), (9, 0.00029308323563892143), (10, 0.00029308323563892143)]

Figure 1:
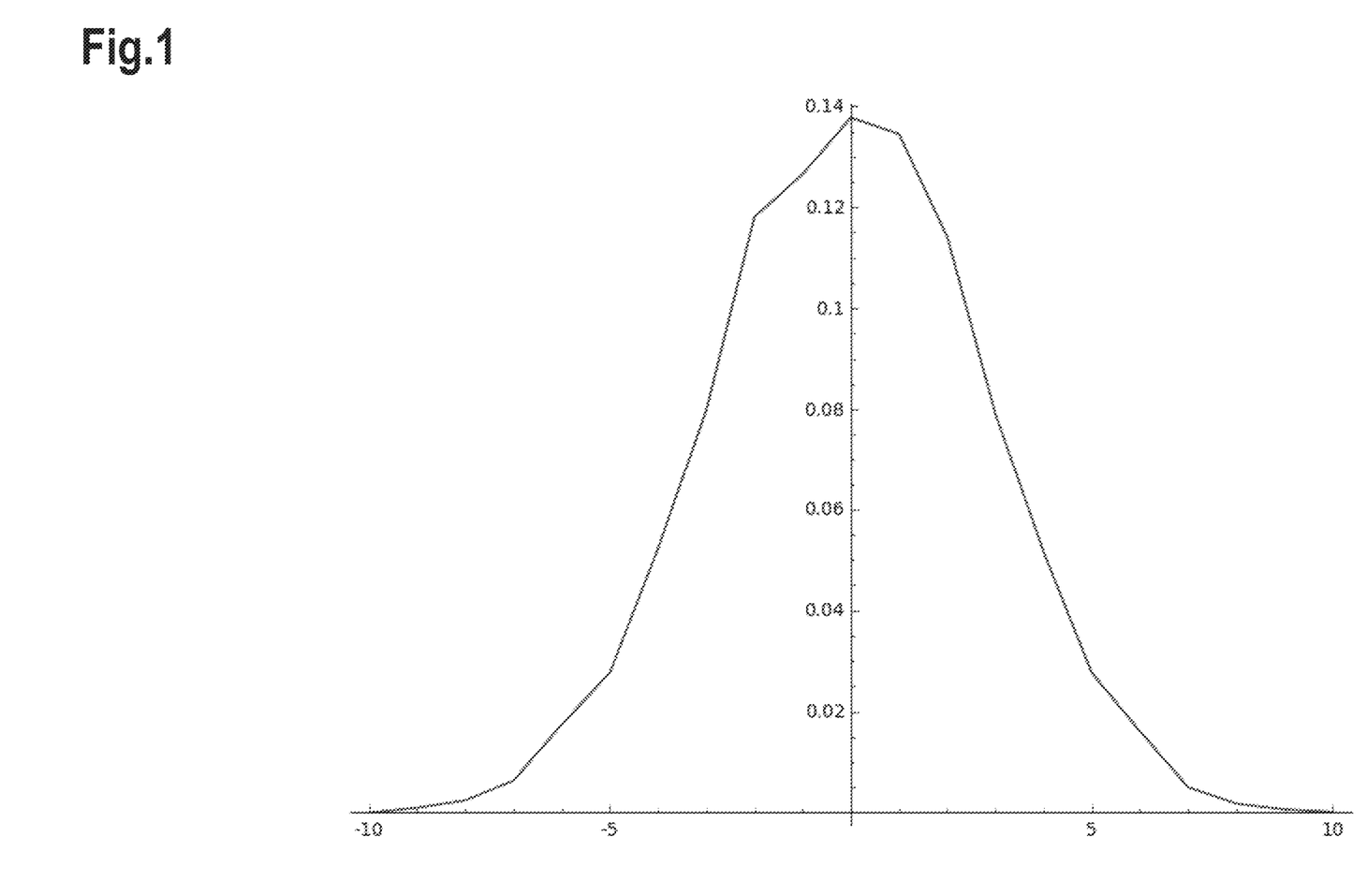
FIG. 1 shows a graph visualizing an exemplary distribution.

FIG. 1 shows a graph visualizing the distribution obtained by the code segment above.

Application in LPR10

The following code segment shows an exemplary application in LPR10:

```
n = 512
q = 7681
k = 8
R.<x> = PolynomialRing(ZZ)
Rq.<x> = PolynomialRing(GF(q))
f = x^n + 1
def key_gen( ):
    a = R([[randint(0,q-1)) for _ in range(n)])
    r1 = R(ConvSample(k))
    r2 = R(ConvSample(k))
    p = r1-a*r2
    sk = r2
    return r2,a,p
def enc(a,p,m):
    e0 = R(ConvSample(k))
```

-continued

```
        e1 = R(ConvSample(k))
        e2 = R(ConvSample(k))
        c1 = (a*e0+e1) % f
        c2 = (p*e0+e2+q//2*R(m)) % f
        return c1,c2
    def dec(r2,c1,c2,m_len):
        x = (c1*r2 + c2) %f
        print centred_list(x)
        m = [ ]
        for i in range(m_len):
            if ((int(x[i])>=q/4.0) and (int(x[i])<=(3/4.0)*q)):
                m.append(1)
            else:
                m.append(0)
        return m
    r2,a,p = key_gen( )
    m = [1,0,1,0,1,1,1,1,1,0]
    print "encrypted message", m
    c1,c2 = enc(a,p,m)
    x = dec(r2,c1,c2,len(m))
    print "decrypted message", x
```

The output is as follows:

encrypted message [1, 0, 1, 0, 1, 1, 1, 1, 1, 0]

[3704, −310, −3730, 64, 3718, 3697, 3694, −3691, −3825, 172, −57, 58, 137, −46, 37, −201, 77, 183, 143, −138, 134, 13, −7, −133, 164, −210, −58, −214, 11, 10, 307, −50, −33, 81, 102, −128, 54, −7, 96, 105, −51, −107, −228, 204, 102, 24, −36, 182, 183, −103, 90, −109, 111, −324, −24, 168, 14, 36, −54, 12, 49, 55, 43, −37, −73, 34, 29, 122, 53, 192, −60, 109, −110, 35, −34, 240, −152, 23, 32, −86, 29, 18, −166, −124, −28, 27, 73, 33, −242, −101, 167, −45, 188, −104, −121, −6, 55, 95, −17, 89, −52, 166, −7, 29, 33, 57, −74, −1, −39, −181, 191, 104, −10, 172, −119, −231, 61, −86, 82, −140, 76, 31, 173, −41, −251, 54, 92, 34, 113, −54, 64, 54, −127, 218, 96, −23, 49, 201, 58, −42, −33, −93, 1, −196, −34, −156, 18, 0, −112, 10, −39, 83, 37, −11, −69, −141, 141, 181, 281, −63, 38, −243, −147, 253, −8, 63, −77, 80, 22, 80, 16, 51, −163, −24, 53, 25, −194, 106, −21, 82, 31, 160, 22, −97, −138, 36, 74, −50, −42, 19, −212, 89, 168, 78, 45, −19, −65, 65, −64, 23, −128, 144, −32, −93, 44, 27, 194, −51, 0, −165, 176, 119, 147, −248, −29, 22, 169, 159, 142, 147, −4, −24, 3, 134, 66, −154, 265, −64, 81, −209, 202, −170, 4, −14, −214, −115, 1, −10, 179, −144, −14, 64, 1, 179, −49, 62, −84, 181, −49, −86, −172, −162, −27, 103, −213, −69, −91, 121, −29, 242, −33, −132, 22, 0, 30, 195, −71, 210, 56, 152, −197, 64, −91, −19, 17, −104, −2, −42, 65, −49, −124, −159, 79, −37, −132, −64, −108, −140, −57, 183, −99, 29, −46, −29, 164, −10, 112, −130, 71, 44, 40, −120, −9, 53, 115, −3, 169, −77, 33, −37, 98, 313, 83, −141, −93, 83, 149, −6, 6, −140, 249, −31, −157, −37, −103, 30, 58, 109, −9, −128, 191, −162, 105, 52, 48, 26, 84, 248, −205, 55, 14, 115, −167, −214, −370, 10, 96, −56, −126, −60, −134, 63, −37, 33, 139, 24, 147, 208, 12, −127, −179, 9, −130, −15, 124, 4, 120, 99, −3, −15, −137, −78, 103, −33, −337, −19, −101, 143, −223, 159, −385, −63, 86, −96, 229, 37, −45, 72, 92, −168, −23, −230, −177, 7, −37, −27, −19, −154, 86, 109, −64, −33, −80, −130, 163, 250, 12, 19, 279, 85, 17, 4, −3, 61, 106, −114, 61, −144, 136, 169, 67, −288, 6, −4, 244, 3, 9, −194, 226, 303, 8, −44, −217, −147, −39, −3, −71, −139, −139, 119, −182, −142, −155, 9, −84, 304, 62, 146, −178, 57, −40, −217, 102, 98, 89, 168, −91, 149, 32, −18, 201, −35, −144, −78, −250, 256, 87, 91, −368, 1, −271, −80, −30, 145, −26, 79, 37, −28, 64, 23, −180, −114, −190, −71, −78, −250, 105, −142, 103, −189, 7, −55, 156, −71, −47, −5, 244, 198, 230, −180, −149, 85, 309, 11, 9, −71, 151, −188, 59, −152, 57, −120]

decrypted message [1, 0, 1, 0, 1, 1, 1, 1, 1, 0]

The following code excerpt refers to a randomized sampling. Randomized computations are performed on two shares, i.e. computations $c^{\wedge'}=a'\cdot b$ and $c^{\wedge''}=r\cdot b$ for $c^{\wedge'}$, $a^{\wedge'}$, b, $c^{\wedge''}$, $r \in R\_q$ are performed. The final result is obtained by compiling the two shares; it holds that $c=c^{\wedge'}-c^{\wedge''}=(a+r)b-r\cdot b=ab+rb-rb=ab$. However, as the two polynomials $c^{\wedge'}$, c'' carry a secret value it makes sense to continue processing on two shares so that further computations are also processed in a protected manner

```
    n=16
    def get_shared_binomial_poly(k) :
        # Sample random value
        r = R([(randint(0,q-1)) for _ in range(n)])
        # Store a in shares
        a_x = r + R([((-1*randint(0,1))*randint(0,1)) for _ in
            range(n)])
        a_xx =r
        # Initialize b with k set positions
        b = R(set_positions(k))
        # Perform the polynomial multiplication
        c_x = a_x*b % f
        c_xx = a_xx*b % f
        # Convert to list and center
        return centred_list(c_x),centred_list(c_xx)
    c_x,c_xx = get_shared_binomial_poly(k)
    print c_x
    print c_xx
```

The output is as follows:

[−1018, 1062,−3445,−1587, 3545, 3793,−811, 863, 1339, 3045,−3514,−3395, 3542,−2607, 621,−210, 215,−1637,−1820, 846, 227,−3235, 415, 606,−1902, 3212, 2328, 179,−904, 1697] [−1018, 1062,−3445,−1586, 3545, 3794,−810, 863, 1340, 3044,−3512,−3396, 3544,−2608, 624,−211, 217,−1639,−1819, 845, 227,−3236, 415, 606,−1902, 3212, 2328, 179,−904, 1697]

$x^{21}+x^{19}-x^{18}+2*x^{17}-2*x^{16}+x^{15}-3*x^{14}+x^{13}-2*x^{12}+x^{11}-2*x^{10}+x^9-x^8-x^6-x^5-x^3$

Side Channel Protection of LPR10 Key Generation

The following code segment refers to side channel protection of LPR10 key generation using the one or more of the embodiments described herein:

```
    n = 512
    q = 7681
    k = 8
    R.<x> = PolynomialRing(ZZ)
    Rq.<x> = PolynomialRing(GF(q))
    f = x^n + 1
    def key_gen( ):
        a = R([(randint(0,q-1)) for _ in range(n)])
        # Obtain r1 in two shares
        r1_p,r1_pp = get_shared_binomial_poly(k)
        # Obtain r2 in two shares
        r2_p,r2_pp = get_shared_binomial_poly(k)
        # Change sign so that r1 = r1_p + r1_pp
        r1_p = R(r1_p)
        r1_pp = -R(r1_pp)
        # Change sign so that r2 = r2_p + r2_pp
        r2_p = R(r2_p)
        r2_p = -R(r2_pp)
        # Initialize p_p and p_pp with random data
        p_p = R([(randint(0,q-1)) for _ in range(n)])
        p_p = R([(randint(0,q-1)) for _ in range(n)])
        # Compute in two shares and store in p_p and p_pp
        p_p = (r1_p - a*r2_p) % f
        p_pp = (r1_pp - a*r2_pp) % f
        # Add both shares together to obtain public key
```

```
    p = p_p + p_pp
    # Output the secret key in two shares
    sk = (r2_p, r2_pp)
    return sk,a,p
def enc(a,p,m):
    e0 = R(ConvSample(k))
    e1 = R(ConvSample(k))
    e2 = R(ConvSample(k))
    c1 = (a*e0+e1) % f
    c2 = (p*e0+e2+q//2*R(m)) % f
    return c1,c2
def dec(r2,c1,c2,m_len):
    # Put shares together
    x = (c1*(r2[0]+r2[1]) + c2) %f
    print centred_list(x)
    m = [ ]
    for i in range(m_len):
        if ((int(x[i])>=q/4.0) and (int(x[i])<=(3/4.0)*q)):
            m.append(1)
        else:
            m.append(0)
    return m
r2,a,p = key_gen( )
m = [1,0, 1, 0, 1, 1, 1, 1, 1, 0]
print "encrypted message", m
c1,c2 = enc(a,p,m)
x = dec(r2,c1,c2,len(m))
print "decrypted message", x
```

The output is as follows:

encrypted message [1, 0, 1, 0, 1, 1, 1, 1, 1, 0]

[3817, 40, 3682, −54, −3840, 3778, 3789, −3822, −3779, −9, 1, 64, −81, −10, −4, −42, −70, 33, −6, −8, −44, 25, 19, −24, 96, 10, −11, −17, 93, −125, −1, −30, 52, −7, 7, 63, −3, 54, 72, −38, 55, −31, 25, −110, 90, −43, 71, −54, −2, −1, 50, 55, 55, −37, 44, 41, −46, −45, 55, 64, 26, 28, −21, −5, 54, −11, −18, 69, −11, 68, −65, 13, 30, 40, 21, 107, 44, −44, −19, 55, 26, 59, 22, −47, −1, 2, −13, −40, −54, 49, 47, 2, −2, 52, 15, 48, −16, 34, 9, −16, 85, −60, −4, 46, −56, 107, 56, −7, −61, 43, 4, −60, 97, 77, 56, 5, 38, −78, 101, 49, 130, −10, 54, −29, −37, −10, 36, 15, 7, 46, 72, −37, 22, −55, 69, −62, 150, −21, −9, 11, 16, −12, 93, 80, −20, −74, 34, 8, −17, −22, 58, 5, 18, 38, 19, −1, 3, 2, 46, −23, 43, 61, −12, 53, −7, 88, 22, 25, −1, −17, −26, −31, −9, −17, −8, 94, −63, 91, −13, 27, −7, 112, −33, 29, 24, 22, −20, 67, 50, −45, −35, 23, 45, 3, −24, 19, −51, −20, 5, 21, −83, 90, 101, −53, 61, −37, 16, −43, 90, −69, 34, 69, −75, −89, −37, 43, −34, −56, −10, −19, −13, 39, 28, 89, 11, −17, 42, −98, 4, −56, 6, −3, 20, −36, 59, −31, 41, −38, 20, 90, −44, −3, −39, −5, 49, −41, 49, 50, 76, 41, −15, −76, 50, 5, 21, −8, 20, 8, −165, 20, −32, 99, 63, 57, 24, 1, −37, −66, −55, 91, −16, −17, −70, −38, −62, −16, −32, 29, 68, 67, −78, −66, −66, 70, −25, 0, 5, −39, −68, 137, −9, 39, 23, 29, −39, −74, −14, −78, −34, 28, 42, 13, 52, 20, 74, −11, −20, 87, 18, −1, −1, −90, 74, −28, 45, −67, 115, 32, −14, −29, 49, −130, 32, −43, 79, 0, 6, 36, 6, 67, 50, 38, 24, −57, 45, 2, −28, 56, −45, −9, −16, 79, −47, 49, −5, 38, 7, 20, 9, 3, 68, 45, −15, 46, −3, 79, −107, 47, 72, 59, −46, 83, 16, −11, 13, 66, 38, 19, −20, −26, 18, 76, 62, 0, 21, 150, −104, 57, −9, 33, 36, 0, 118, −27, 48, 29, 58, 7, 48, 81, 36, 16, 35, −15, −9, 93, 65, 50, 78, −43, 98, 22, −7, 12, 71, 35, 12, −70, 22, 1, 55, 46, 64, 44, 8, 10, 40, −44, 142, −3, 46, 21, −49, −14, 5, 64, 75, 30, 31, 19, 23, 81, 55, 96, 70, 23, 81, 3, 25, 37, 80, 20, 20, 49, −15, 34, 39, 75, −36, 126, −4, 47, 45, 27, −25, 68, −10, 34, 19, 6, 95, −91, 4, 67, −1, −80, 52, 22, −51, 13, −16, 21, 92, 149, 16, 3, 129, −38, 76, 22, 13, −50, −72, 22, −38, −16, 147, 23, 54, 10, −1, 55, −2, 7, 52, −77, 12, −9, 32, −86, 113, 36, 50, −6, 15, −56, 6, −40, 13, −10, −13, −46]

decrypted message [1, 0, 1, 0, 1, 1, 1, 1, 1, 0]

ADVANTAGES AND FURTHER EMBODIMENTS

It is an option to generate more values than required and to randomly select some values and discard other values.

For example values obtained by $c' \leftarrow^\$ \text{ConvSample}(k)$ may be reordered. The Fisher-Yates algorithm can be used to randomly shuffle coefficients in c' and to obtain an output c=Fisher-Yates(c').

If more than one polynomial is required, like in Protocol 3 of E. Alkim, L. Ducas, T. Pöppelmann, P Schwabe, Post-quantum key exchange—a new hope, in: IACR Cryptology ePrint Archive 2015: 1092 (2015), which is incorporated by reference: s', e', $e'' \leftarrow^\$ \psi_k$, it might be a security benefit to obtain values from different polynomials. Thus, three polynomials may be sampled:

$$c' \leftarrow^\$ \text{ConvSample}(k),$$

$$c'' \leftarrow^\$ \text{ConvSample}(k),$$

$$c''' \leftarrow^\$ \text{ConvSample}(k).$$

The next polynomial s' is generated by randomly selecting the coefficients of s' from any of the polynomials c', c'', c'''. The coefficients that have been used may be marked to not be used again. The same may be applied to obtain the polynomials e' and/or e''.

It is another option to conduct a sampling using a parameter k' that is smaller than required and combine the output. For example, conduct sampling two times with k/2 to obtain the polynomials c' and c''. Combine the two sampled polynomials as c=c'+c''. Alternatively and/or additionally, the coefficients of c', c'' can be randomly combined into c.

Alternatively and/or additionally, the structure inside of the sampler may be broken up by obtaining $c' \leftarrow^\$ \text{ConvSample}(k-1)$. A polynomial $e' \leftarrow^\$ U(R_{q,1})$ may be added, where coefficients are −1 (0.5 probability) and/or 1 (0.5 probability). An output may be provided as: c=c'+e'.

Figure 2:
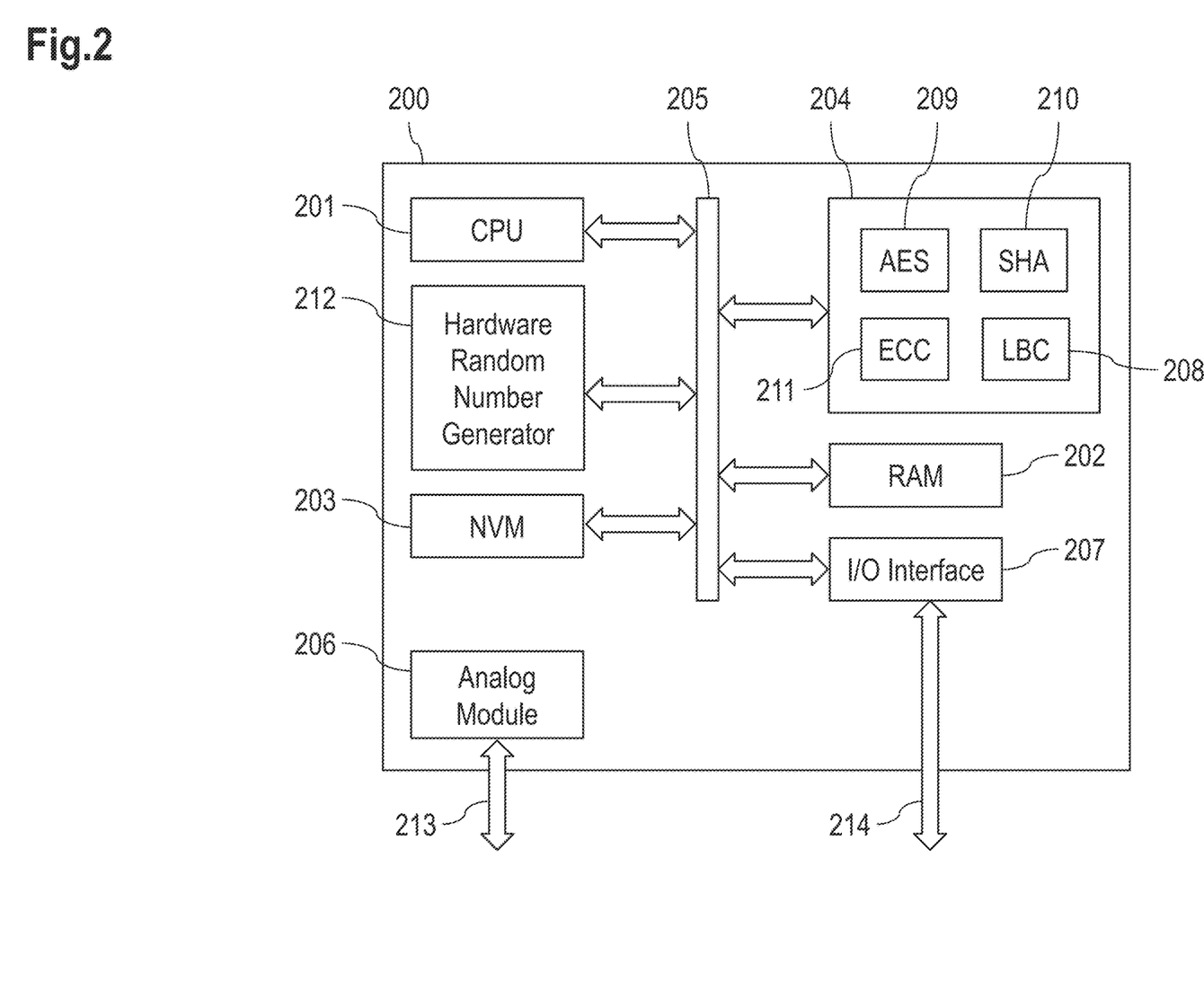
FIG. 2 shows an exemplary arrangement of a processing device comprising a CPU, a RAM, a non-volatile memory, a crypto module, an analog module, an input/output interface and a hardware-random number generator.

FIG. 2 shows a processing device 200 comprising a CPU 201, a RAM 202, a non-volatile memory 203 (NVM), a crypto module 204, an analog module 206, an input/output interface 207 and a hardware-random number generator 212.

In this example, the CPU 201 has access to at least one crypto module 204 over a shared bus 205 to which each crypto module 204 is coupled. Each crypto module 204 may comprise one or more crypto cores to perform certain cryptographic operations. Exemplary crypto cores are:
  an AES core 209,
  a SHA core 210,
  an ECC core 211, and
  a lattice-based crypto (LBC) core 208.

The lattice-based crypto core 208 may be provided in order to accelerate lattice-based cryptography.

The CPU 201, the hardware random number generator 212, the NVM 203, the crypto module 204, the RAM 202 and/or the input/output interface 207 are connected to the bus 205. The input output interface 207 may have a connection 214 to other devices, which may be similar to the processing device 200.

The crypto module 204 may or may not be equipped with hardware-based security features.

The analog module 206 is supplied with electrical power 213 via an electrical contact and/or via an electromagnetic field. This power is supplied to drive the circuitry of the processing device 200 and may allow the input/output interface to initiate and/or maintain connections to other devices via the connection 214.

The bus 205 itself may be masked and/or plain. Instructions to process one or more acts described herein may be stored in the NVM 203 and/or processed by the CPU 205. The data processed may be stored in the NVM 203 and/or in the RAM 202. Supporting functions may be provided by the crypto modules 204 (e.g., expansion of pseudo random data). Random numbers are supplied by the hardware-random number generator 212.

One or more techniques presented herein, such as acts of the method described herein may exclusively or at least partially be conducted on the crypto module 204, e.g., on the lattice-based crypto core 208. For example, instructions may be stored in the lattice-based crypto core 208 or they may be provided by the CPU 201 via the bus 205. Data may be stored locally with the lattice-based crypto core 208. It is also an option that the data is temporarily stored in the RAM 202 or the NVM 203. The lattice-based crypto core 208 may also use other crypto modules to provide supporting functions (e.g., expansion of pseudo random data). The lattice-based crypto core 208 may also comprise a hardware-random number generator 212 and/or a means to generate physical and/or software random numbers.

The processing device 200 may be a chip card powered by direct electrical contact or through an electro-magnetic field. The processing device 200 may be a fixed circuit or based on reconfigurable hardware (e.g., Field Programmable Gate Array (FPGA)). The processing device 200 may be coupled to a personal computer, microcontroller, FPGA and/or a smart phone.

Figure 3:
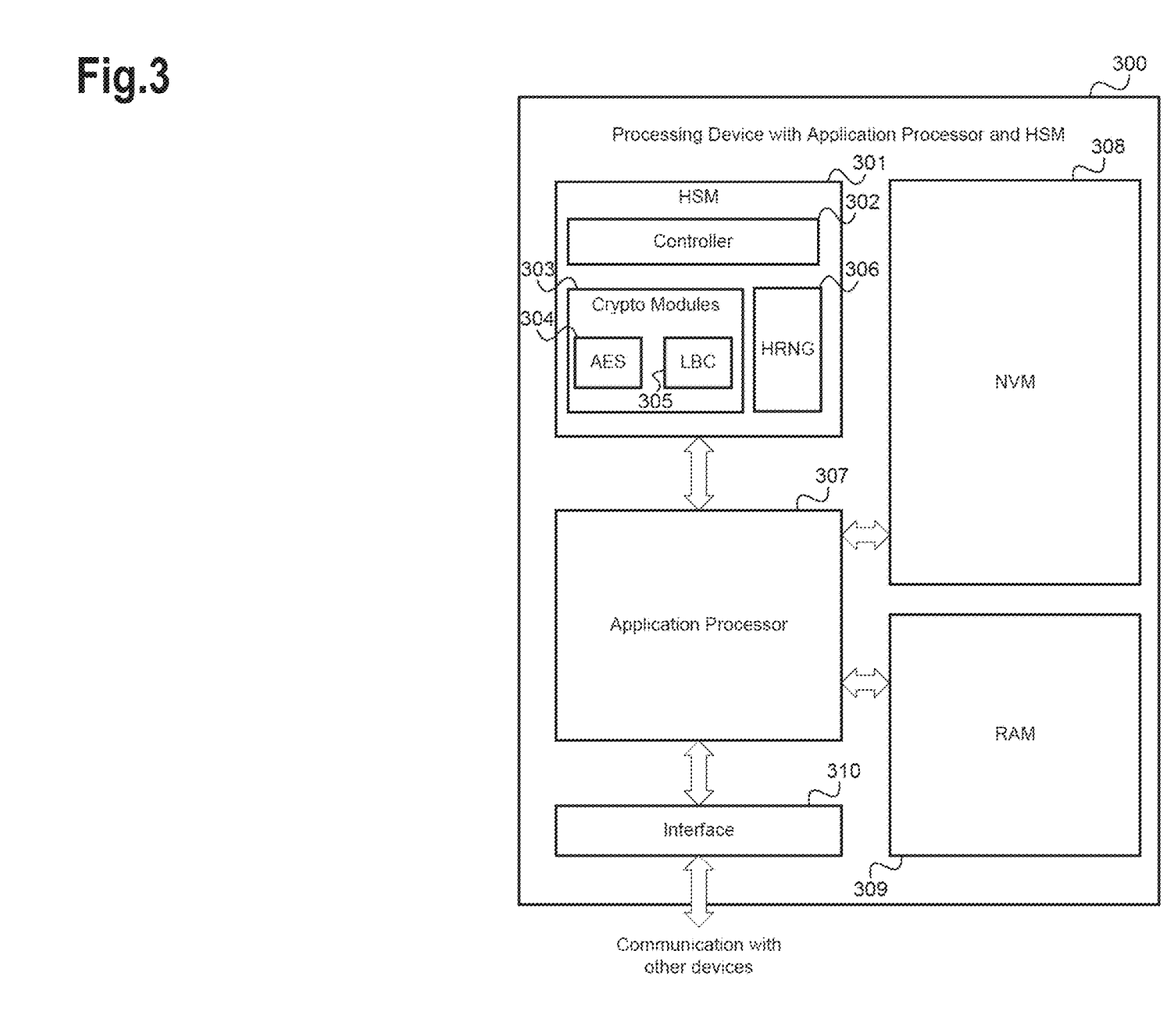
FIG. 3 shows an alternative arrangement with a hardware security module (HSM)

FIG. 3 shows another example of a processing device 300. The processing device 300 comprises a hardware security module 301, a non-volatile memory (NVM) 308, an application processor 307, a random access memory (RAM) 309, an interface 310 for communication with other devices and an application processor 307, which is coupled with the hardware security module (HSM) 301, the RAM 309 and/or the interface 310.

The HSM 301 comprises a controller 302, a hardware-random number generator (HRNG) 306 and/or at least one crypto module 303. The crypt module 303 exemplarily comprises an AES core 304 and/or a Lattice-based crypto (LBC) core 305.

According to one embodiment, the hardware security module (HSM) 301 and the application processor 307 may be fabricated on the same physical chip with a tight coupling. The HSM 301 delivers cryptographic services and secured key storage while the application processor may perform computationally intensive tasks (e.g., image recognition, communication, motor control). The HSM 301 may be only accessible by a defined interface and considered independent of the rest of the system in a way that a security compromise of the application processor 307 has only limited impact on the security of the HSM 301. The HSM 301 may perform one, some and/or all tasks described with respect to the processing device 300 by using the controller 302, the LBC 305, supported by, exemplary, an AES 304 and the HRNG 306. It may execute the procedures described herein (at least partially) controlled by an internal controller and/or as CMOS circuit. Alternatively and/or additionally, the application processor 307 may perform the procedures described herein (at least partially, e.g., in collaboration with the HSM 301).

The processing device 300 with application processor and/or HSM 301 may be used as a central communication gateway or (electric) motor control unit in cars and/or other vehicles.

In one or more examples, the functions described herein may be implemented at least partially in hardware, such as specific hardware components or a processor. More generally, the techniques may be implemented in hardware, processors, software, firmware, and/or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media and/or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage and/or other magnetic storage devices, flash memory and/or any other medium that can be used to store desired program code in the form of instructions or data structures and that can be accessed by a computer. Alternatively and/or additionally, any connection is properly termed a computer-readable medium, i.e., a computer-readable transmission medium. For example, if instructions are transmitted from a website, server and/or other remote source using a coaxial cable, fiber optic cable, twisted pair, digital subscriber line (DSL) and/or wireless technologies such as infrared, radio, and microwave, then the coaxial cable, fiber optic cable, twisted pair, DSL and/or wireless technologies such as infrared, radio, and microwave are included in the definition of medium. It should be understood, however, that computer-readable storage media and data storage media do not include connections, carrier waves, signals and/or other transient media, but are instead directed to non-transient, tangible storage media. Disk and disc, as used herein, includes compact disc (CD), laser disc, optical disc, digital versatile disc (DVD), floppy disk and Blu-ray disc where disks may reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs) and/or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and/or decoding and/or incorporated in a combined codec. Alternatively and/or additionally, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules and/or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments have been disclosed within the present disclosure, it will be apparent to those skilled in the art that various changes and modifications can be made which will achieve some of the advantages of the present disclosure without departing from the spirit and scope of the present disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, techniques and/or methods of the present disclosure may be achieved in software implementations, using the appropriate processor instructions, and/or in hybrid implementations that utilize a combination of hardware logic and software logic to achieve the same results. Such modifications to the present disclosure are intended to be covered by the appended claims.

The invention claimed is:

1. A method for executing a cryptographic operation on a security device, the method comprising:
  sampling a first polynomial, wherein coefficients of the first polynomial are determined based on a first distribution such that:
    a value 0 of the first polynomial occurs with a probability amounting to $\zeta$,
    a value $-\lim1$ of the first polynomial occurs with a probability amounting to $\alpha$, and
    a value $\lim1$ of the first polynomial occurs with a probability amounting to $\beta$, wherein $\zeta+\alpha+\beta=$near 1;
  sampling a second polynomial, wherein a selection of k coefficients of the second polynomial is determined based on a second distribution;
  multiplying the first polynomial with the second polynomial to determine a result; and
  executing the cryptographic operation using the result of the multiplication, wherein the method is performed to increase the robustness of the security device against one or more side-channel attacks.

2. The method according to claim 1, wherein the cryptographic operation is an operation using at least one of a secret or an error, wherein the result of the multiplication is at least one of the secret or the error.

3. The method according to claim 1, comprising using the cryptographic operation to at least one of:
  generate a public key,
  generate a signature,
  generate a private key, or
  encrypt data.

4. The method according to claim 1, wherein the coefficients of the first polynomial and the k coefficients of the second polynomial are determined based on random numbers.

5. The method according to claim 1, comprising randomly shuffling coefficients of at least one of the first polynomial, the second polynomial or the result.

6. The method according to claim 1, wherein the k coefficients of the second polynomial are determined such that
  a value $-\lim2$ of the second polynomial occurs with a probability of 0.5 and
  a value $\lim2$ of the second polynomial occurs with a probability of 0.5.

7. The method according to claim 6, wherein $\lim2$ is a number between 1 and 5.

8. The method according to claim 1, wherein the method is used on the security device comprising at least one of:
  an integrated circuit,
  a hardware security module,
  a trusted platform module,
  a crypto unit,
  a Field Programmable Gate Array (FPGA),
  a processing unit,
  a controller, or
  a smartcard.

9. The method according to claim 1, wherein the cryptographic operation is a cryptographic Lattice operation.

10. The method according to claim 1, wherein at least one of sampling the first polynomial or sampling the second polynomial comprises at least two acts of sampling and one act of selecting at least one of the first polynomial or the second polynomial from the at least two acts of sampling.

11. A security device that is arranged to execute acts, the acts comprising:
  sampling a first polynomial, wherein coefficients of the first polynomial are determined based on a first distribution such that:
    a value 0 of the first polynomial occurs with a probability amounting to $\zeta$,
    a value $-\lim1$ of the first polynomial occurs with a probability amounting to $\alpha$, and
    a value $\lim1$ of the first polynomial occurs with a probability amounting to $\beta$, wherein $\zeta+\alpha+\beta=$near 1;
  sampling a second polynomial, wherein a selection of k coefficients of the second polynomial is determined based on a second distribution;
  multiplying the first polynomial with the second polynomial to determine a result; and
  executing a cryptographic operation using the result of the multiplication, wherein the acts are performed to increase the robustness of the security device against one or more side-channel attacks.

12. The security device according to claim 11, wherein the security device comprises at least one of:
  an integrated circuit,
  a hardware security module,
  a trusted platform module,
  a crypto unit,
  a Field Programmable Gate Array (FPGA),
  a processing unit,
  a controller, or
  a smartcard.

13. A computer program product loadable into a memory of a digital processing device, comprising software code for performing acts for executing a cryptographic operation on a security device, the acts comprising:
  sampling a first polynomial, wherein coefficients of the first polynomial are determined based on a first distribution such that:
    a value 0 of the first polynomial occurs with a probability amounting to $\zeta$,
    a value $-\lim1$ of the first polynomial occurs with a probability amounting to $\alpha$, and a value lim1 of the first polynomial occurs with a probability amounting to β, wherein $\zeta+\alpha+\beta$=near 1;

sampling a second polynomial, wherein a selection of k coefficients of the second polynomial is determined based on a second distribution;

multiplying the first polynomial with the second polynomial to determine a result; and executing a cryptographic operation using the result of the multiplication, wherein the acts are performed to increase the robustness of the security device against one or more side-channel attacks.

14. The computer program product according to claim 13, wherein the cryptographic operation is an operation using at least one of a secret or an error, wherein the result of the multiplication is at least one of the secret or the error.

15. The computer program product according to claim 13, the acts comprising using the cryptographic operation to at least one of:
generate a public key,
generate a signature,
generate a private key, or
encrypt data.

16. The computer program product according to claim 13, wherein:
the first distribution
is different than the second distribution.

17. The computer program product according to claim 13, wherein the coefficients of the first polynomial and the k coefficients of the second polynomial are determined based on random numbers.

* * * * *